No. 882,463. PATENTED MAR. 17, 1908.
M. G. GRIGGS.
EDUCATIONAL APPLIANCE.
APPLICATION FILED JUNE 8, 1907.
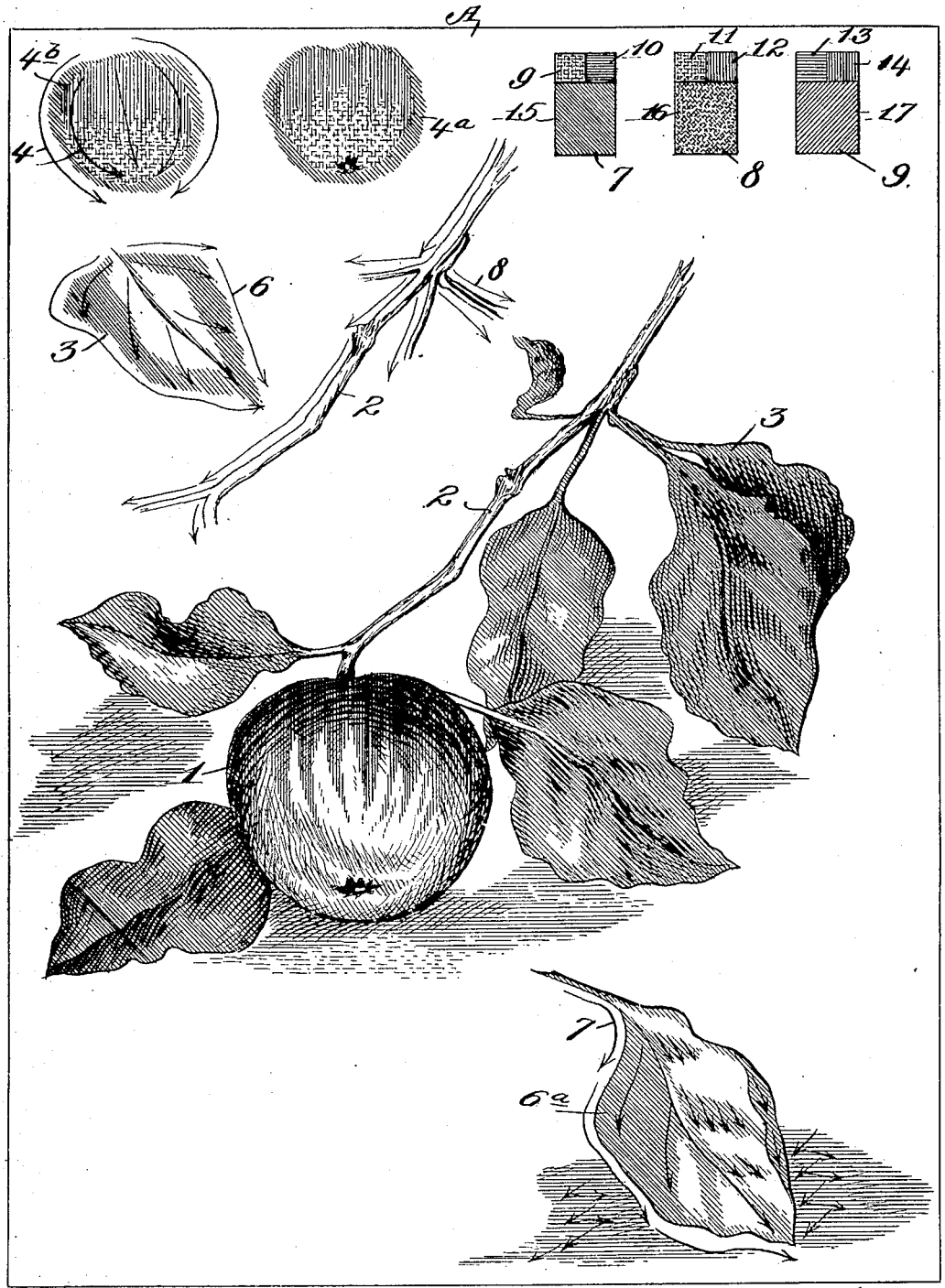
Witnesses:
Inventor
Mary Goodwin Griggs
By James L. Norris
Atty

UNITED STATES PATENT OFFICE.

MARY GOODWIN GRIGGS, OF ATLANTA, GEORGIA.

EDUCATIONAL APPLIANCE.

No. 882,463.  Specification of Letters Patent.  Patented March 17, 1908.

Application filed June 8, 1907. Serial No. 378,005.

*To all whom it may concern:*

Be it known that I, MARY GOODWIN GRIGGS, a citizen of the United States, residing at Atlanta, in the county of Fulton and State of Georgia, have invented new and useful Improvements in Educational Appliances, of which the following is a specification.

This invention relates to a chart for teaching painting and one of the objects thereof is to provide a chart in a manner as hereinafter set forth, to assist the student when copying designs in color, and furthermore to instruct the student in the art of mixing colors so that the student can readily obtain the desired color, if such color does not form part of the student's paint-box.

A further object of the invention is to provide a chart for teaching painting, with means in a manner as hereinafter set forth for indicating to the student in what direction the brush should travel when applying the color; furthermore to provide the chart with means whereby the student by reference thereto can readily ascertain how to mix two or more colors to obtain the necessary color to be used when copying the design, if the student has not such color in his paint-box or upon his palette.

A further object of the invention is to provide a chart for teaching painting embodying the design which is to be copied in color by the student, the design not only being shown as a whole but also in fragments, certain of the fragments being partly colored and provided with means to indicate in what direction the brush should travel when applying the color and the other fragments of the design being completely colored, such arrangement materially aiding the student when copying portions of the design preparatory to copying the complete design.

Further objects of the invention are to provide a chart for teaching painting, which shall be unusually instructive to the student, simple so that the instructive features thereof can be readily grasped by the student, quickly teaching the manner of mixing colors so as to obtain the desired color or tint, conveniently handled, and inexpensive to manufacture.

With the foregoing and other objects in view, the invention consists of a novel construction of chart for teaching painting as hereinafter more specifically described and illustrated in the accompanying drawings wherein is shown one embodiment of the invention, but it is understood that changes, variations and modifications can be resorted to which come within the scope of the claims hereunto appended.

In describing the invention in detail reference is had to the accompanying drawings, wherein is shown a plan of a chart which constitutes an educational appliance in accordance with this invention.

In the drawing is shown by way of example a design to be copied, such design consisting of an apple, its stem and leaves, but it is evident that the invention is not limited to the precise design as shown, as the chart can be provided with any desired design to be copied. In the drawing is also shown by way of example three color-mixing-indicating means, but it is evident that the number of color-mixing-indicating means can be increased so that all the necessary colors or tints for the student to use when copying the design will form a part of the chart.

Referring to the drawings by reference characters, A denotes the chart which is formed of any suitable material and of any preferred size. The chart A is provided with a unitary design which, as shown, consists of an apple 1, its stem 2 and a plurality of leaves 3, the design being colored as well as tinted so that it will be similar to the object from which the design was made. The chart is furthermore provided with a fragmentary portion of the design, such fragmentary portion illustrating the apple and indicated by the reference character 4, but it is not completely colored or finished. The incompleted fragmentary portion of the design is provided with a plurality of arrows 4 for indicating in what direction the student should move the brush when applying the color. Upon the chart is provided another fragmentary portion of the design, which illustrates the apple 1 in a more complete state and with the arrows omitted. This latter fragmentary portion of the design is indicated by the reference character 42. The chart is furthermore provided with another fragmentary portion of the design, such fragmentary portion being the leaf 3 and is shown in an incompleted state. Arrows 6 are provided to indicate in what direction the colors should be applied when copying the leaf. The chart also illustrates the leaf 3 in a more completed state as indicated by the reference character $6^a$. Arrows 7 indicate in what direction the brush should be moved when applying the color during the copying of the leaf. The chart has another fragmentary portion of the design and which is the stem 2, arrows 8 being provided for indicating in what direction the color is to be applied when copying the stem.

The unitary design is preferably arranged approximately centrally of the chart A and the fragmentary portions of the design are disposed at suitable points throughout the chart. The unitary design, as well as the fragmentary portions of the design are so disposed as to prevent any obscurity so that they can be readily perceived by the student.

The chart is shown as provided with a color-mixing-indicating means, each of said means being shown by combining a plurality of colors in a rectangular manner. By way of example three color-mixing-indicating means are illustrated which are indicated by the reference characters 7, 8 and 9. The colors shown by way of example are yellow, blue, red, green, orange and purple. In the color-mixing-indicating means 7, it is illustrated that the mixing of yellow and blue will form green. The reference character 9 denotes the yellow, 10 the blue and 15 the green. In the color-mixing means 8 it is illustrated that the mixing of yellow and red will form orange, and in this connection 11 indicates the yellow, 12 the red, 16 the orange, and in the color-mixing-indicating means 9 it is illustrated that the mixing of blue and red will form purple and in this connection 13 indicates the blue, 14 the red and 17 the purple.

The resulting color from the mixing of two or more colors in the color mixing-indicating means is illustrated in a somewhat more pronounced manner than the colors which are mixed and by such an arrangement the student can readily see the color desired and then conveniently ascertain how such desired color is obtained.

It is evident from the foregoing arrangement of chart for teaching painting that a chart is set up which will readily indicate to the student the manner of coloring the design which is to be copied, the manner in which the colors should be applied and an indicating means whereby the student may readily obtain the desired color by mixing two or more colors.

What I claim is—

1. A chart for teaching painting provided with a design in colors to be copied and portions of said design in an incompleted state, symbolistic means for indicating in what direction the colors should be applied when copying the design, and means for indicating the mixing of certain colors to obtain the color to be used in copying the design.

2. A chart for teaching painting provided with a design, and a symbolistic means in connection with said design for indicating in what direction colors should be applied when copying the design.

3. A chart for teaching painting provided with a design, symbolistic means in connection with said design for indicating in what direction colors should be applied when copying the design, and means for indicating what colors should be mixed to obtain a color similar to a color of the design when copying the latter.

4. A chart for teaching painting provided with a design in colors to be copied and fragmentary portions of said design in an incompleted state, symbolistic means in connection with said fragmentary portions of the design for indicating in what direction colors should be applied when copying the design, and means for indicating what colors are to be mixed to obtain a color similar to a color of the design when copying the latter.

In testimony whereof I have hereunto set my hand in presence of two subscribing witnesses.

MARY GOODWIN GRIGGS.

Witnesses:
H. J. SIMONTON,
MYRON HERZBERG.